United States Patent Office 3,482,993
Patented Dec. 9, 1969

3,482,993
PROCESS FOR PREPARING A QUICK-COOKING
PASTA PRODUCT
Thomas P. Finucane, Hartsdale, N.Y., assignor to
General Foods Corporation, White Plains, N.Y.,
a corporation of Delaware
No Drawing. Continuation of application Ser. No.
257,881, Feb. 12, 1963. This application June 2,
1965, Ser. No. 460,854
Int. Cl. A23l 1/16
U.S. Cl. 99—85                               4 Claims

ABSTRACT OF THE DISCLOSURE

Quick-cooking pasta products and processes of preparing the same by cooking ungelatinized pasta to a moisture content of 60–75%, quenching the cooked gelatinized pasta in excess cold water at temperatures of 60°–125° F., drying the pasta at a temperature of 170°–200° F. to a moisture content of less than 10% at a rate whereby the moisture is evaporated from the interior and exterior of the product so that the product is substantially unpuffed and has an apparent density at least equal to that of water.

---

This invention relates to improvements in the production of alimentary paste composition products.

This application is a continuation of application Ser. No. 257,881, filed Feb. 12, 1963, and now abandoned, which application is a continuation-in-part of application Ser. No. 3,518, filed Jan. 20, 1960, and now abandoned.

More particularly, the present invention relates to new and improved process for the manufacture of products such as macaroni and the like, including spaghetti and others, and to the novel character of the resulting product, which character may be specified as: (a) permitting comparative ease of rehydration to a chewy eating quality, that is, cooked to the acceptable degree of tenderness; (b) rehydratability in a reduced quantity of water such that no pouring or draining of water is necessary in preparation of the product, (c) rehydratability of the product in water without floating, and (d) elimination of any need for a rinse of the rehydrated cooked material to eliminate sticky surface starch thereon.

The process of the present invention is characterized by a minimum of drying time to produce the product of the present invention and further by the ability to use macaroni, spaghetti and like alimentary paste products of commerce which products are customarily produced by forming dough or pasta compositions of selected ungelatinized wheat flour and water, with or without added materials such as egg solids, soy flour, soy protein isolates, etc., and having a moisture content of approximately 27–34% as they come from the presser-extruder.

A specific advantage and object of the present invention is the ability to use the precooked alimentary paste product in combination with other dried rehydratable food compositions in mixes intended for use as casseroles or like products having blended therewith suitable seasonings, cheeses, vegetables and other flavoring materials which call for a single liquid addition of moisture and a simple heat treatment in an oven for a period of time in the order of 45 minutes to permit hydration of the mix.

It has now been discovered that the objects of the present invention may be met by cooking a pasta product to obtain a moisture content of 60–75% and to effect gelatinization of the starch without destruction of the structural integrity of the product. The cooked pasta is quenched to a temperature below 125° F. thereby terminating cooking. The quenched pasta product is then dried at a temperature of 170–200° F. to a moisture content of less than 10% at a rate whereby the moisture is evaporated from the interior of the product at a rate substantially equal to that at which the moisture evaporates from the exterior so that the product is substantially unpuffed and has an apparent density at least equal to that of water.

In carrying out the present invention, a macaroni or similar alimentary paste products as described hereinabove in either dried or freshly extruded form is cooked to a moisture content of about 60–75%, preferably about 65%, by water cooking, steam cooking or a combination thereof to effect gelatinization of the starch without destruction of the structural integrity of the alimentary paste or pasta product. Such cooking is carried out generally in an excess of water and preferably in boiling water for a period in the neighborhood of 6–10 minutes. Typically, the dried, uncooked pasta will have a moisture content of about 10–13% and the freshly extruded, uncooked pasta a moisture content of about 30–35%.

The cooked pasta product is rapidly quenched in an excess of cold water, which quenching may be effected continuously or on a batch basis by the addition of quantities of water, and has as its object the termination of the cooking operation at the desired degree of tenderness of the product.

The quenching, in addition to terminating the cooking, removes excess surface starch from the cooked pasta product, which would otherwise interfere with:

(a) The ability to dry the product discretely;
(b) The ability to produce a product which will rehydrate effectively, as will be explained hereinafter. The pasta product after quenching will generally have a moisture content in the neighborhood of that which is produced in the course of cooking to the desired eating quality and will have a product temperature ranging below 125° F. and preferably at 60°–90° F.

If desired with certain types of pasta products, the quenched product may be subjected to a washing step to remove additional surface starch not completely removed during quenching.

The quenched pasta product is thereafter dried to a moisture content of less than 10% by a process whereby the moisture is evaporated from the interior of the product shape at a rate substantially equal to that at which the moisture evaporates from the surface of the product. In this way, a product which is relatively unpuffed and at the same time free of case hardening is obtained. The product is further characterized by an apparent density equal to or greater than that of water so that the product will not float in water but either will be suspended or sink therein. Generally, this drying is carried out at a temperature of less than 200° F. Preferably, the product is dried at a temperature of 170°–185° F., this temperature being that of the circulated air employed to dehydrate the product. Drying will generally be carried out under these conditions in about 50–70 minutes, the rate for drying being dependent in part upon the drying condition and facilities which may take the form of a foraminous tray, belt, trough or cylinder.

In any event, a drying temperature of above 200° F. must be avoided since at temperatures above the product will puff and subsequently will float such that subsequent rehydration will be difficult and incomplete at the surface of the floated particles.

The following examples set forth several embodiments of the present invention:

EXAMPLE I

One hundred pounds of commercial elbow macaroni were cooked in an excess of water at 212° F. for 8 minutes. Immediately after cooking, the water was rapidly drained from the macaroni and cold tap water at about 55°–60° F. was added to the cooker to quench the macaroni to below 125° F. and to remove free surface starch. The water was drained from the macaroni and the macaroni was placed on the belt of a commercial belt dryer in a mono-layer and passed through the drying section in 27 minutes at a belt speed of 0.75 foot per minute. Air was circulated through the drying section at a temperature of 170°–185° F. The product passed through the drying section in 27 minutes and at the end of this drying step had a moisture content in the neighborhood of 22%. The product which was partially dried was then passed through the dryer a second time using a multilayer bed.

EXAMPLE II

One hundred pounds of U.S. No. 1 semolina flour were blended with 25 pounds of water in a commercial pasta mixer-extruder and extruded in noodle form. The extruded noodles were then processed in accordance with the procedure set forth in Example I.

The product obtained accomplishes the object stated hereinabove in that a rapid hydration of product in combination with other food compositions employed for seasoning, flavoring and the like is obtained using a minimum amount of water which water is well below that customarily called for in preparing a cooked, hydrated pasta product and need not be drained from the product nor replaced with additional quantities of water for the purpose of washing off free starch.

In boiling water the pasta product will rehydrate in 4–6 minutes. If four parts of water are used for one part of pasta product, there will be little or no free water present upon completion of rehydration.

The hydrated product is further characterized by its ability to achieve after 30–45 minutes of cooking in water at temperatures of 180° F. substantial freedom from pastiness when wetted.

It will be understood that while the invention has been described in part by means of specific examples, reference should be had to the appended claims for a definition of the scope of the invention.

What is claimed is:

1. A process for preparing a quick-cooking pasta product consisting essentially of cooking an ungelatinized pasta product to obtain a moisture content of 60–75% and to effect gelatinization of the starch without destruction of the structural integrity of the product, quenching said cooked pasta product in an excess of cold water to a temperature of 60°–125° F. to terminate cooking and remove free excess surface starch, and drying said product at a temperature of 170°–200° F. to a moisture content of less than 10% at a rate whereby the moisture is evaporated from the interior and exterior of said product at substantially the same rate so that said product is substantially unpuffed and has an apparent density at least equal to that of water.

2. A process for preparing a quick-cooking pasta product consisting essentially of cooking an ungelatinized pasta product to obtain a moisture content of 60–75% and to effect gelatinization of the starch without destruction of the structural integrity of the product, quenching said cooked pasta product in an excess of cold water to a temperature of 60°–125° F. to terminate cooking and remove free excess surface starch, washing said quenched product, and drying said product at a temperature of 170°–200° F. to a moisture content of less than 10% at a rate whereby the moisture is evaporated from the interior and exterior of said product at substantially the same rate so that said product is substantially unpuffed and has an apparent density at least equal to that of water.

3. A process for preparing a quick-cooking pasta product consisting essentially of cooking an ungelatinized pasta product to obtain a moisture content of 60–75% and to effect gelatinization of the starch without destruction of the structural integrity of the product, quenching said cooked pasta product to a temperature of 60°–90° F. to terminate cooking and remove free excess surface starch, and drying said product at a temperature of 170°–185° F. to a moisture content of less than 10% at a rate whereby the moisture is evaporated from the interior and exterior of said product at substantially the same rate so that said product is substantially unpuffed and has an apparent density at least equal to that of water.

4. A process for preparing a quick-cooking pasta product consisting essentially of cooking an ungelatinized pasta product to obtain a moisture content of 60–75% and to effect gelatinization of the starch without destruction of the structural integrity of the product, rapidly quenching said cooked pasta product by immersion in an excess of cold water to obtain a temperature of 60–125° F., washing said quenched product while maintaining a temperature below 125° F., creating a mono-layer bed of said product and circulating hot drying air thereover at a temperature of 170°–185° F. to at least partially reduce the moisture content of said product, creating a multilayer bed of said product having a partially reduced moisture content and drying said bed with air having a temperature of 170°–185° F. to reduce the moisture content to less than 10% moisture, said drying being continued at a rate sufficient to evaporate moisture from the interior and exterior of said product at substantially the same rate so that said product is substantially unpuffed and has an apparent density at least equal to that of water.

References Cited

UNITED STATES PATENTS

| | | | |
|---|---|---|---|
| 2,677,613 | 5/1954 | Shiah | 99—85 |
| 2,813,796 | 11/1957 | Keneaster et al. | 99—80 |

RAYMOND N. JONES, Primary Examiner